Aug. 9, 1955  C. J. WAMPOLE  2,714,761
ASSEMBLING MACHINE
Filed Oct. 7, 1949  8 Sheets-Sheet 1
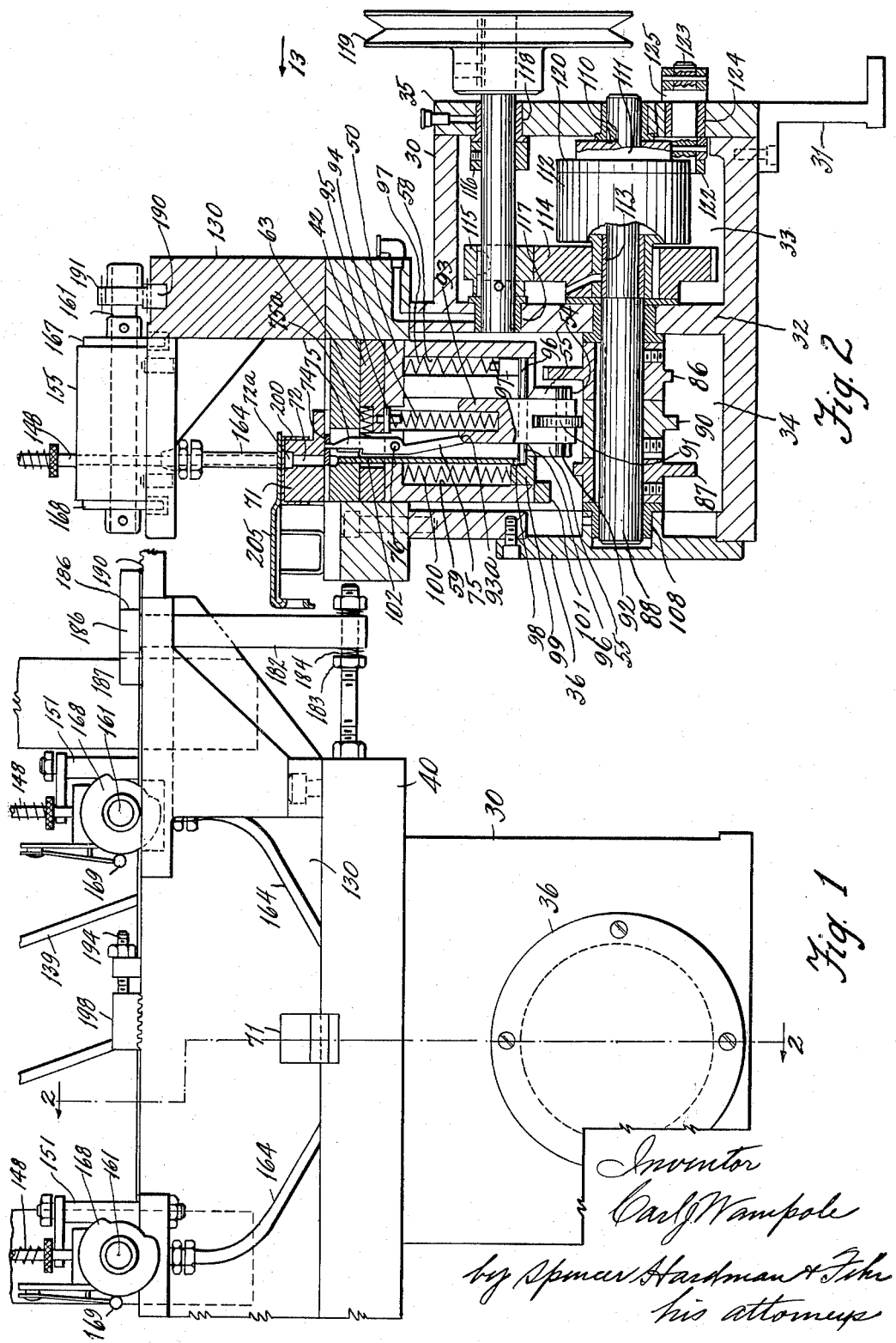
Inventor
Carl J. Wampole
by Spencer Hardman & Fehr
his attorneys

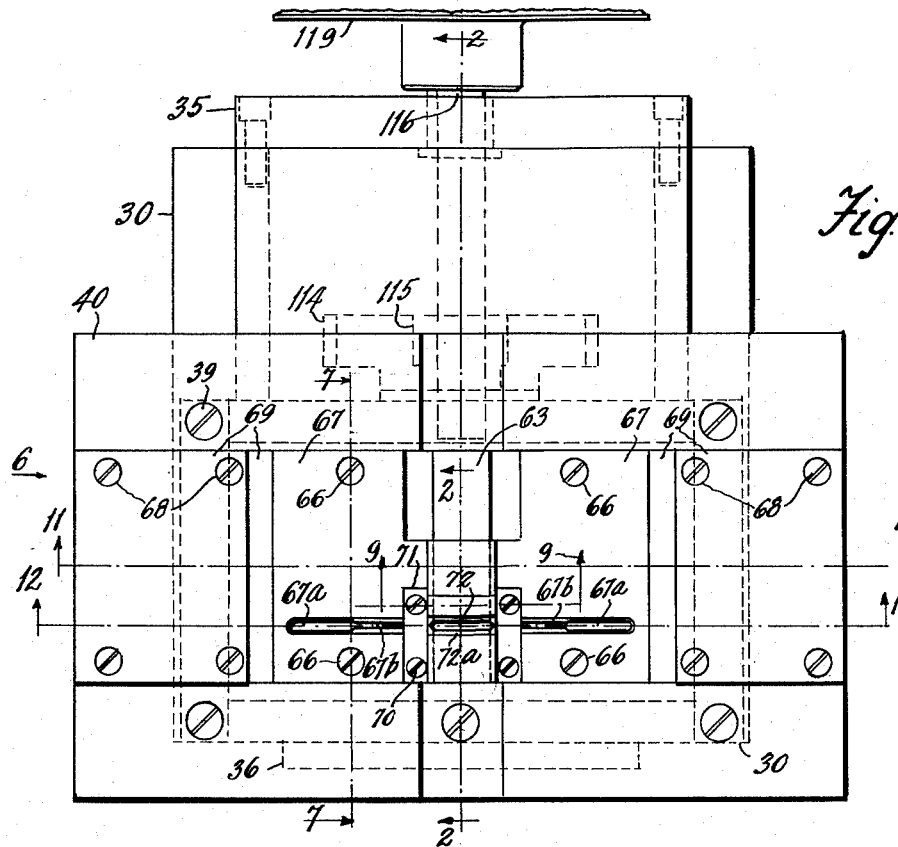
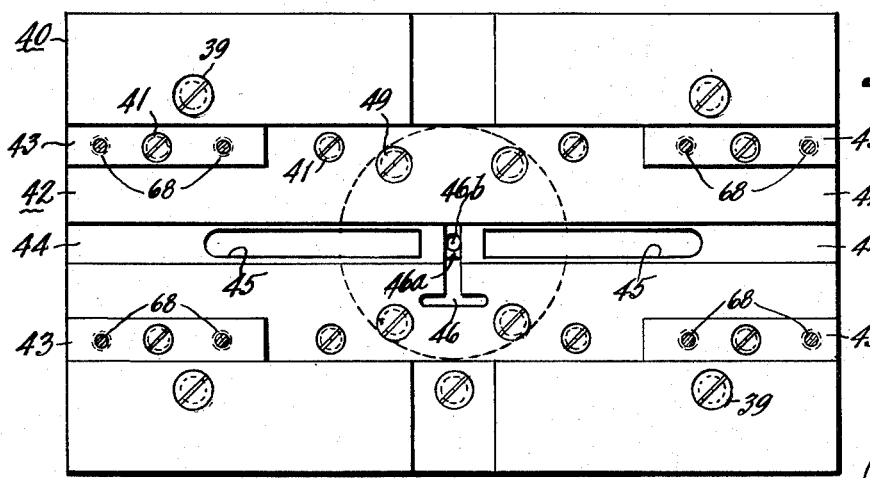

Aug. 9, 1955 C. J. WAMPOLE 2,714,761
ASSEMBLING MACHINE
Filed Oct. 7, 1949 8 Sheets-Sheet 3
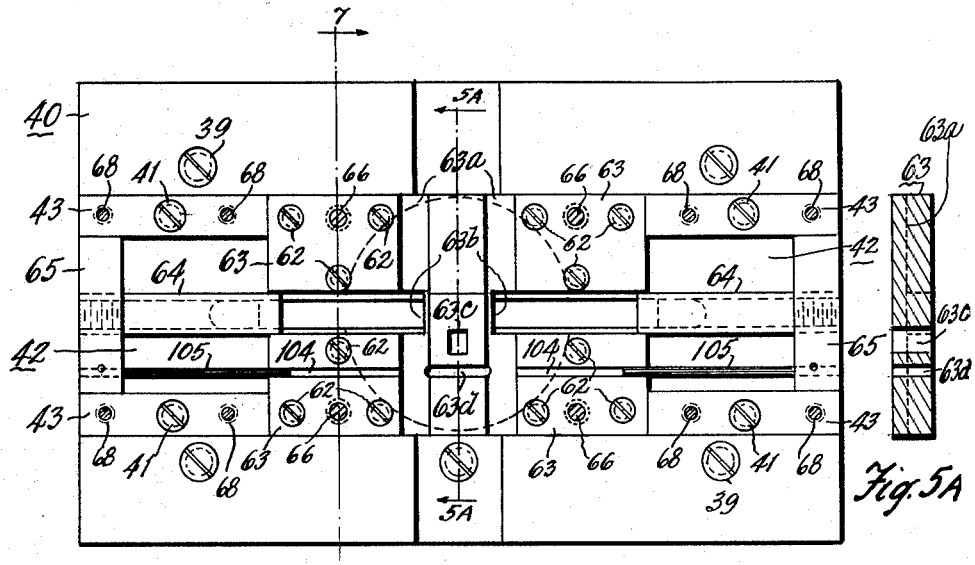
Fig. 5
Fig. 5A
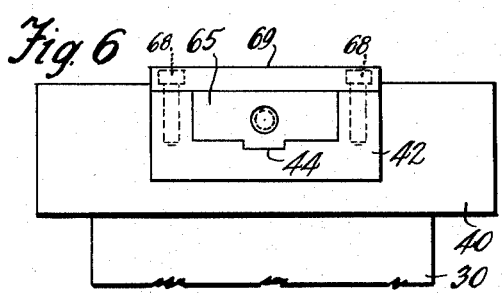
Fig. 6
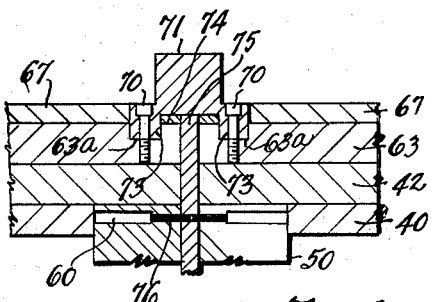
Fig. 9
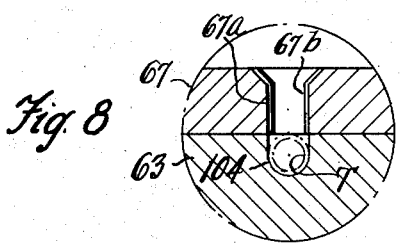
Fig. 7
Fig. 8
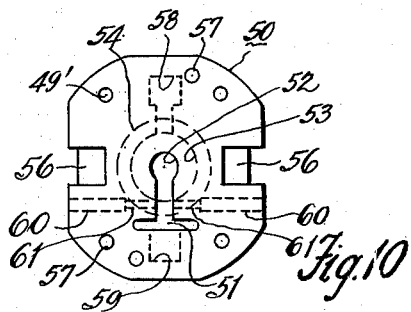
Fig. 10
Inventor
Carl J. Wampole
by Spencer, Hardman & Fehr
his attorneys Aug. 9, 1955　　　　　C. J. WAMPOLE　　　　2,714,761
ASSEMBLING MACHINE Filed Oct. 7, 1949　　　　　　　　　　　　8 Sheets-Sheet 4

Inventor
Carl J. Wampole
by Spencer Hardman Fisher
his attorneys

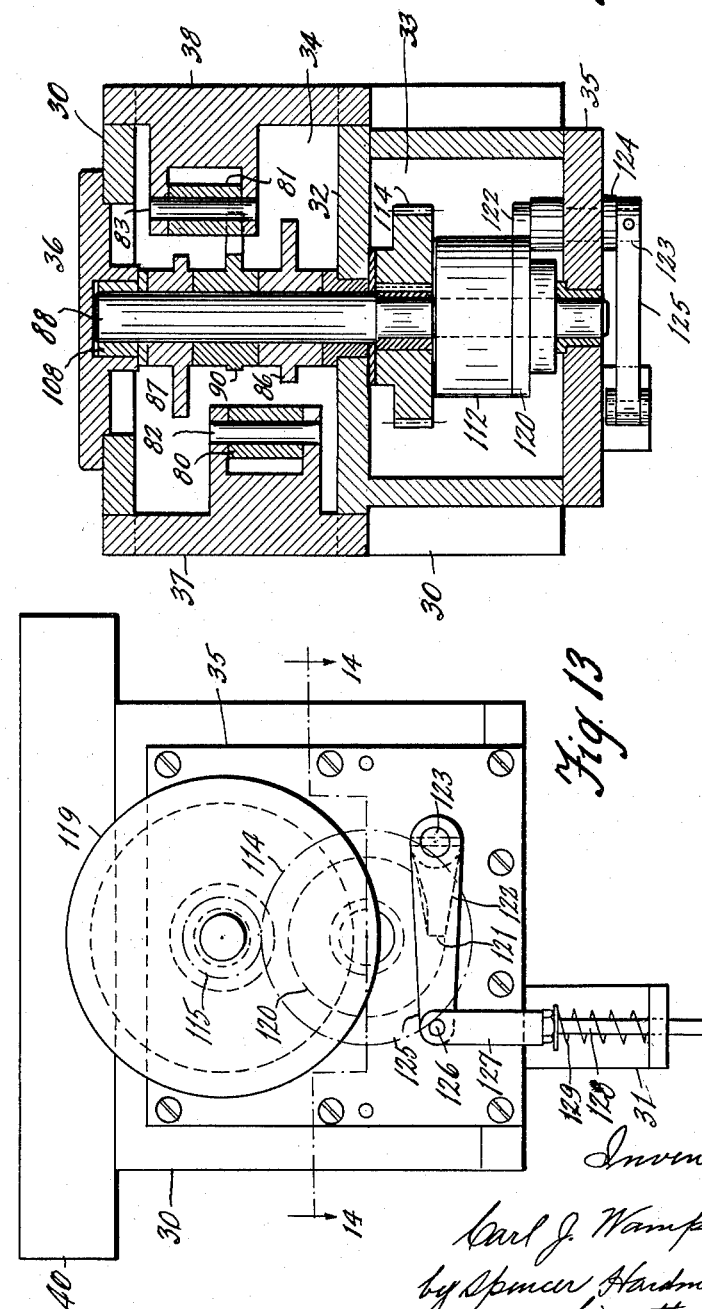

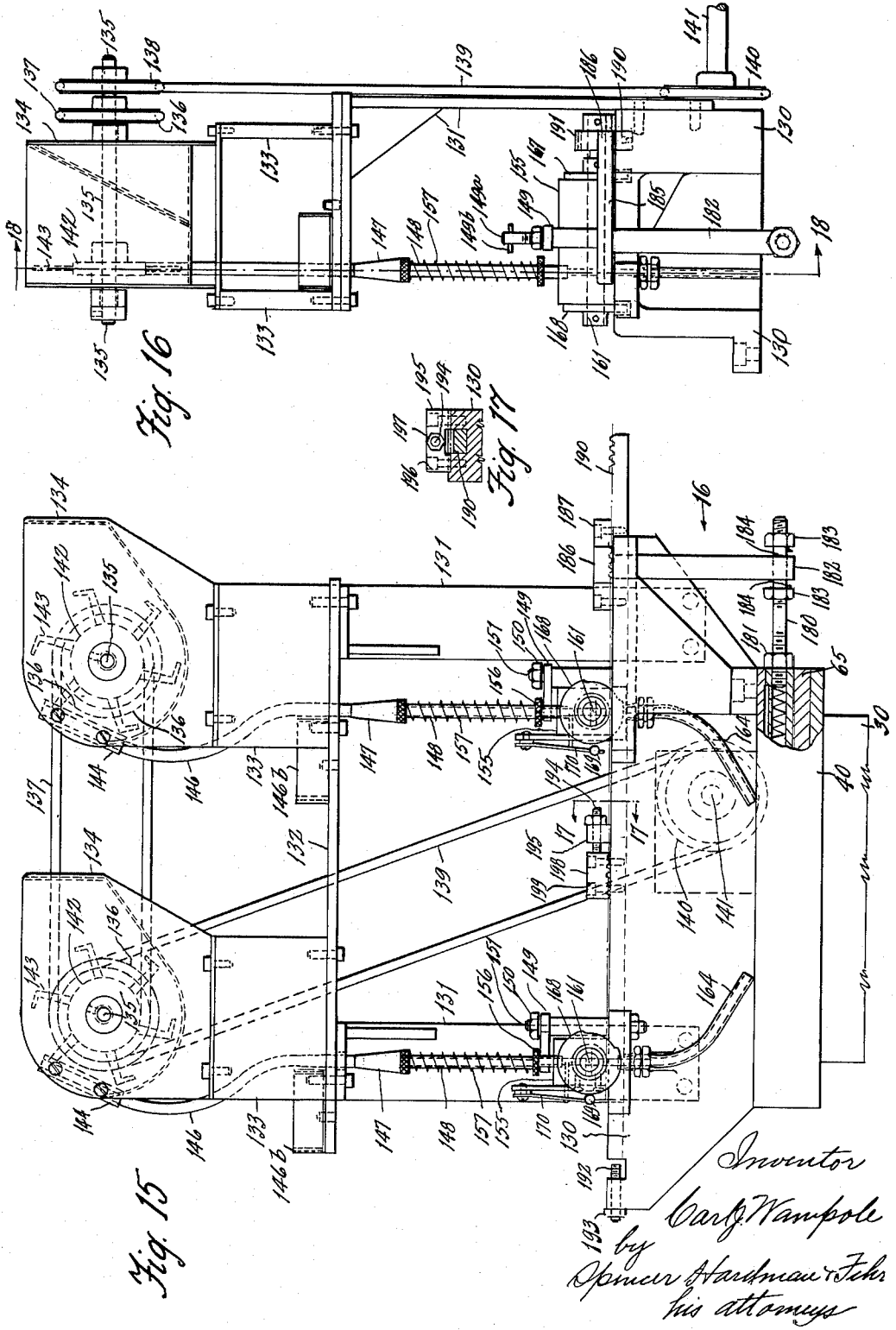

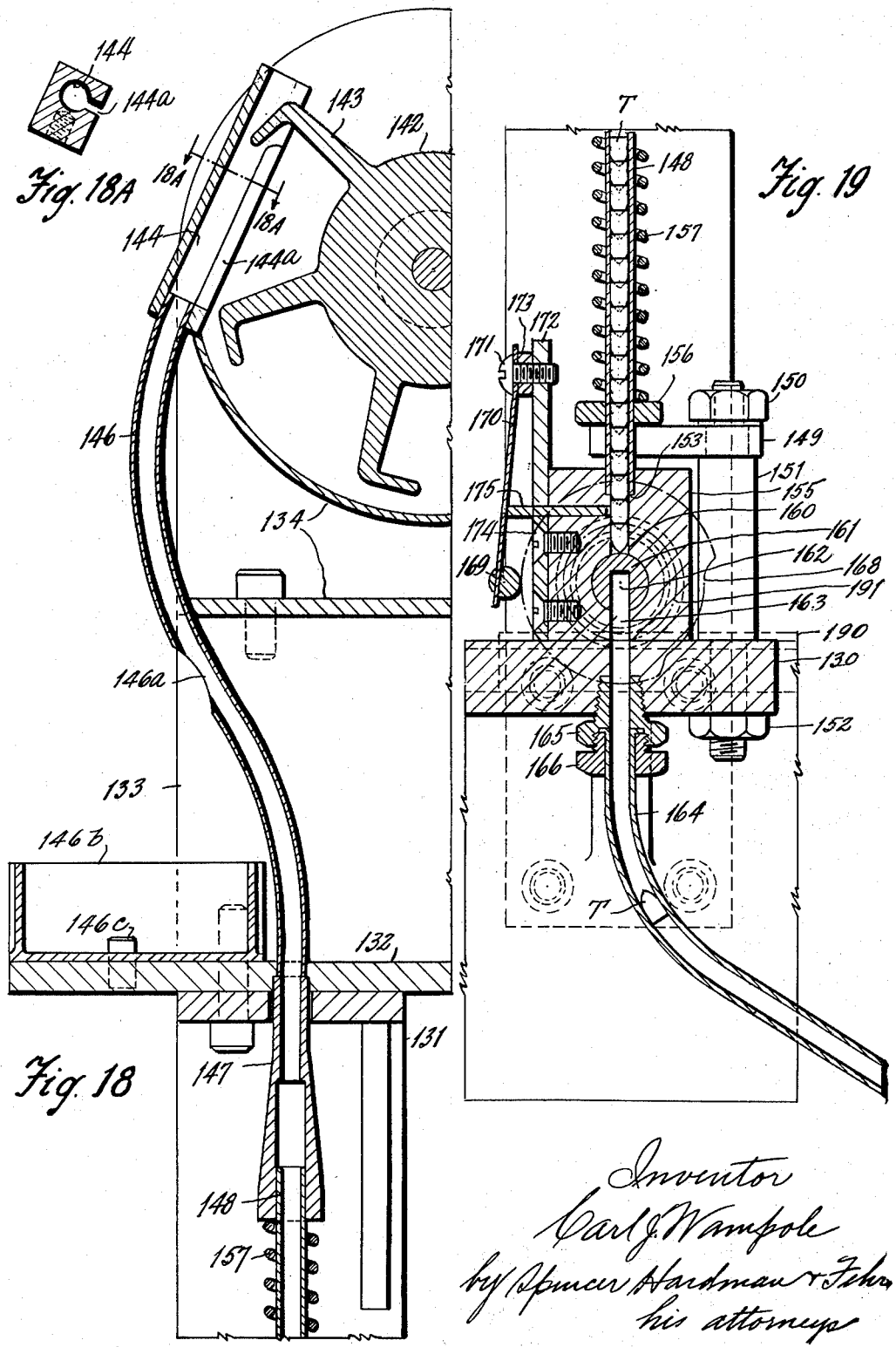

Aug. 9, 1955   C. J. WAMPOLE   2,714,761
ASSEMBLING MACHINE
Filed Oct. 7, 1949   8 Sheets-Sheet 8
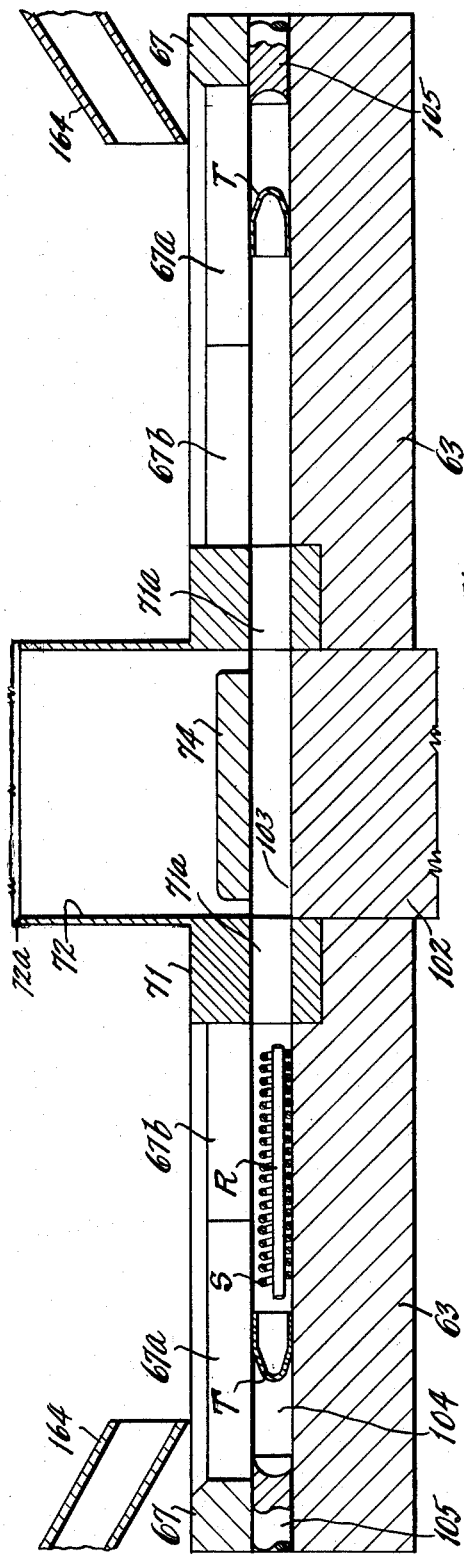
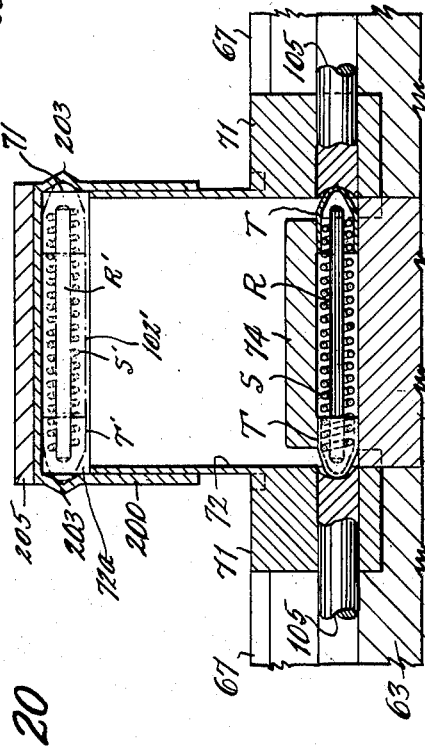
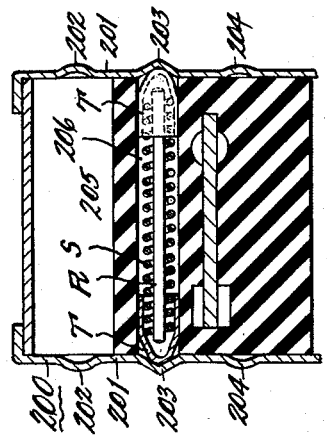
Inventor
Carl J. Wampole
by Spencer Hardman & Fehr
his attorneys United States Patent Office 2,714,761
Patented Aug. 9, 1955

2,714,761

ASSEMBLING MACHINE

Carl J. Wampole, Anderson, Ind., assignor to General Motors Corporation, Detroit, Mich., a corporation of Delaware Application October 7, 1949, Serial No. 120,202

3 Claims. (Cl. 29—203)

This invention relates to the manufacture of electric switches of the type comprising a switch case which encloses a movable switch-contact carrier operated by a push and pull rod. Opposite walls of the switch case are provided with a series of depressions into which thimbles moving with the carrier are urged by a spring thereby yieldingly maintaining the carrier in various positions.

An object of the invention is to provide a machine for assembling the switch case, the thimbles and spring preparatory to assembling the carrier with the switch case. In the disclosed embodiment, this object is accomplished by the combination comprising a workholder which supports the switch case, a mechanism for assembling the thimbles, the spring and a spring-retaining rod and for compressing this assembly preparatory to passing it into the switch case and mechanism for moving the assembly laterally through the workholder and into the switch case.

Further objects and advantages of the present invention will be apparent from the following description, reference being had to the accompanying drawings, wherein a preferred embodiment of the present invention is clearly shown.

In the drawings:

Fig. 1 is a front view of the machine and a fragment of the mechanism for feeding the thimbles to the machine.

Fig. 2 is a sectional view on the lines 2—2 of Figs. 1 and 3.

Fig. 3 is a plan view of the machine, the thimble feeder being omitted.

Fig. 4 is a plan view of the assembly parts 40 and 42 of the machine.

Fig. 5 is a view similar to Fig. 4 with certain parts added. Fig. 5A is a sectional view on line 5A—5A of Fig. 5.

Fig. 6 is a fragmentary view in the direction of arrow 6 of Fig. 5.

Fig. 7 is a fragmentary sectional view on line 7—7 of Fig. 5.

Fig. 8 is an enlargement of that portion of Fig. 7 included within the circle 8.

Fig. 9 is a fragmentary sectional view on line 9—9 of Fig. 3.

Fig. 10 is a plan view of part 50.

Figure 11:
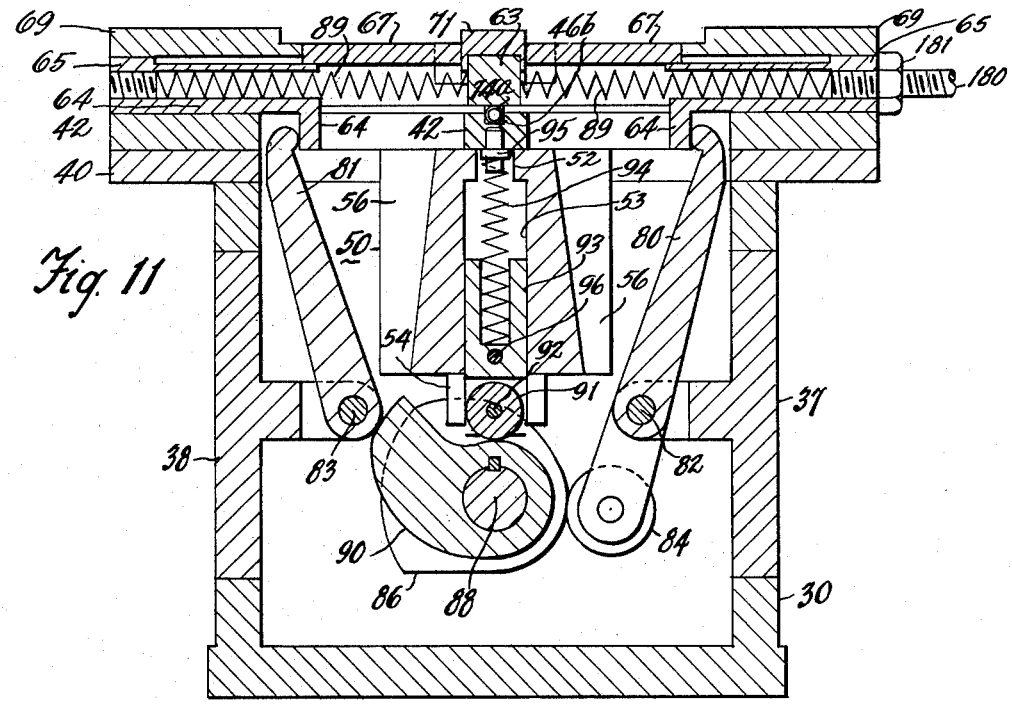
Figure 12:
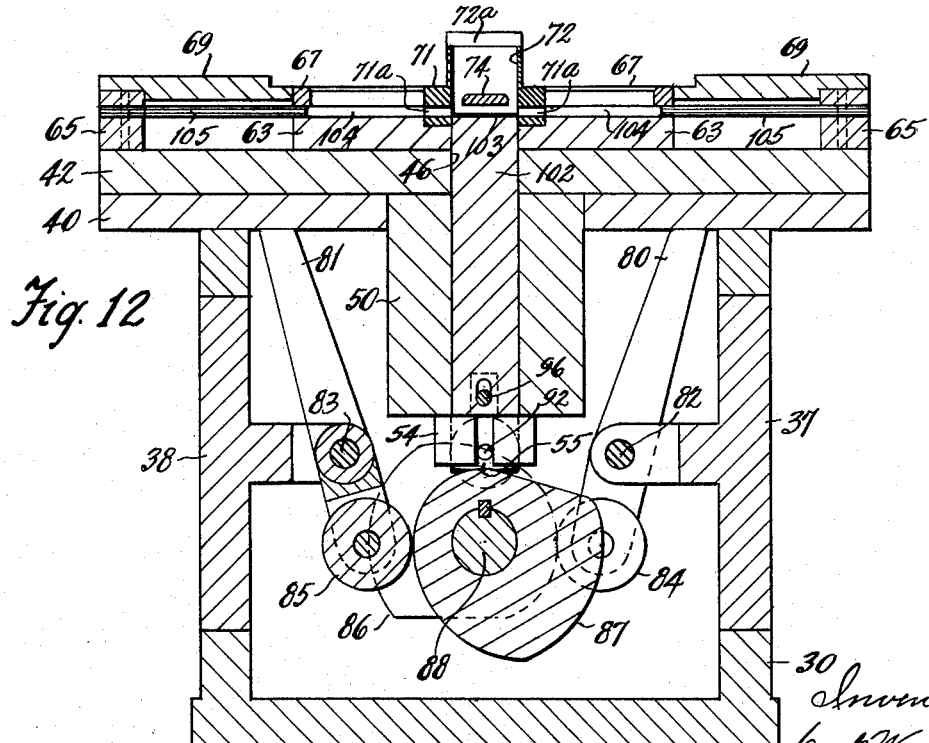

Figs. 11 and 12 are sectional views taken respectively, on lines 11—11 and 12—12 of Fig. 3.

Fig. 13 is a view in the direction of arrow 13 of Fig. 2.

Fig. 14 is a sectional view on line 14—14 of Fig. 13.

Fig. 15 is a front view of the thimble feeding mechanism.

Fig. 16 is a view in the direction of arrow 16 of Fig. 15.

Fig. 17 is a fragmentary sectional view on line 17—17 of Fig. 15.

Fig. 18 and 19 constitute together larger scale fragmentary sectional views on the line 18—18 of Fig. 16.

Fig. 18A is a sectional view on line 18A—18A of Fig. 18.

Fig. 20 is an enlargement of a portion of the upper part of Fig. 12 and shows the thimbles and the spring retaining rod in position prior to assembling.

Fig. 21 is a view similar to Fig. 20 showing the switch parts in assembled relation prior to assembly with the switch case.

Fig. 22 is a fragmentary sectional view of a switch including the switch case, contact carrier and the parts which are assembled with the case by the machine.

The machine comprises a frame 30 (Fig. 1) supported above the floor by legs 31 (Fig. 2) and having a partition 32 which separates chambers 33 and 34. Chamber 33 is closed at one end by plate 35. Chamber 34 is closed by plate 36. Opposite side walls of chamber 34 (Fig. 14) are closed by plates 37 and 38. Chamber 34 is closed at the top by plate 40 attached by screws 39 (Fig. 3). Screws 41 (Fig. 4) secure to plate 40, a plate 42 having four rectangular bosses 43 at the corners thereof and having a groove surface 44 through which elongated apertures 45 extend. Plate 42 has also an inverted T-shaped aperture 46 extending to a depressed portion 46a having a hole 46b. Screws 49 secure the plate 42 to a block 50 (Figs. 10–12) having an inverted T-shaped slot 51 connected with an internal bore including a portion 52 of smaller diameter and a portion 53 of larger diameter and surrounded by a skirt 54 which, as shown in Fig. 12, is notched at 55. Block 50 provides diametrically opposite notches 56. The tapped holes 49' receive the screws 49. Holes 57 receive dowel pins (not shown). The central bore 53 communicates with rectangular grooves 58 and 59 (Figs. 2 and 10). A cross hole has larger diameter portion 60 and smaller diameter portion 61.

Screws 62 (Fig. 5) attach to plate 42, a plate 63 having grooves 63a, notches 63b extending from the ends of plate 63 and nearly across the groove 63a, a square hole 63c and a slot 63d. Bars 65, which slide between bosses 43, are integral with bars 64 received by grooves 44 of plate 42 and by notches 63d of plate 63. Screws 66 secure cover plates 67 to plates 42 and 63. Plate 67 has notches comprising wider portions 67a and narrower portions 67b. Screws 68 (Fig. 3) secure to bosses 43 of plate 42 cover plates 69. Screws 70 attach to plate 63 a workholder 71 having a slot 72 extending through it and in alignment with slot 63d of plate 63, slot 46 of plate 42 and slot 51 of block 50. Holder 71 (Fig. 9) has parts 73 received by grooves 63a of plate 63. The holder 71 guides for horizontal movement a bar 74 which serves as a gate. Bar 74 (Fig. 2) is actuated by a lever 75 pivoted on a pin 76 received by the bore 61 in member 50.

Referring to Figs. 11 and 12, bars 64 are actuated by levers 80 and 81 pivoted on rods 82 and 83, respectively, carried by plates 37 and 38, respectively, and carrying rollers 84 and 85, respectively, engageable with cams 86 and 87, respectively, connected with a shaft 88. Springs 89 bearing against plate 63 urge the bars 64 apart and the rollers 84 and 85 against cams 86 and 87 respectively. A cam 90 (Fig. 11) connected with shaft 88 engages a roller 91 journaled on a pin 92 carried by a plunger 93, sliding in the bore 53 in block 50 (Fig. 10) and urged downwardly by a spring 94 received by a pocket in the plunger and by a stud 95 pressed into hole 46a of plate 42 (Fig. 4). The plunger 93 carries a pin 96 whose right end (Fig. 2) is engaged by a block 97 (Fig. 2) received by groove 58 of block 50 and urged downwardly by a spring 97a. The left end of pin 96 is received by a slot 98 in a block 99 slidable in the groove 59 of block 50 and urged downwardly by a spring 100 against a plate 101 attached to block 50. A blade 102, integral with the block 99, extends through the slot 51 of block 50, through the slot 46 of plate 42 (Fig. 4) and through the slot 63b of plate 63 and terminates with a concave, cylindrical surface 103 (Figs. 2, 20 and 12) located normally flush with grooves 104 in plate 63 which receive pusher rods 105 attached to bars 65. The plunger 93 (Fig. 2) has a beveled camming edge 93a for engaging the lower end of lever 75 which is urged counterclockwise by a spring 75a retained in pocket 46b of plate 42 (Fig. 4).

Referring to Fig. 2, shaft 88 is journaled in bearing 108 supported by cover 36, bearing 109 supported by partition 32 and bearing 110 supported by cover 35. Shaft 88 is connected with a clutch driven element 111 connectible with a clutch driving element 112 carrying a bearing 113 journaled on shaft 88 and connected with a gear 114 meshing with a gear 115 driven by a shaft 116 journaled in a bearing 117 supported by partition 32 and in a bearing 118 supported by a cover 35. Shaft 116 is connected with a pulley 119 which is connected by a belt with a suitable power source, not shown. The clutch includes a control disc 120 having a notch to provide a stop 121 engageable with a lever 122 (Fig. 13) attached to a shaft 123 journaled in a bearing 124 provided by cover 35 and connected with a lever 125, connected by a pin 126 and a clevis 127 with a rod 128 connected with a foot pedal, not shown. A spring 129 urges the rod 128 upwardly and the lever 122 counterclockwise against the edge of disc 120 which rotates counterclockwise. Consequently the motion of the disc will be arrested when its stop 121 engages the lever 122. When this occurs, the clutch members become disengaged. The lowering of the rod 128 by depressing the foot pedal retracts lever 122 from the plate 120 and the clutch members become engaged and remain engaged while the foot pedal is depressed. As the clutch is well known to those skilled in the art of tool design, its details are not disclosed.

The thimble feeding mechanism will now be described with reference to Figs. 15–19. A frame 130 which is attached to plate 40 supports brackets 131 which support a plate 132, which supports plates 133 which support hoppers 134. Each hopper supports a shaft 135. The two shafts 135 are connected together by pulleys 136 and a belt 137. The left shaft is connected by pulley 138 and belt 139 with a pulley 140 connected with a power driven shaft 141. Each shaft 135 drives a disc 142 having a plurality of fingers 143 which, as the disc 142 (Fig. 18) rotates counterclockwise, pick up thimbles T and carry them into a channel 144 connected with a slot 144a which receives the fingers. As the thimbles gravitate from the fingers, they descend through a tube 146 attached to plate 132 and connected with a tube 147, the upper end of which is received in a recess provided by plate 132. The thimbles descend through a tube 148 telescoping in tube 147 and received by a recess 153 in a block 155. Tube 148 extends past an arm 149 attached by nut 150 to a stud 151 which extends through a hole in bracket 130 and secured by nut 152. Arm 149 supports a screw 149a (Fig. 16) supporting a cross pin 149b. A collar 156, attached to tube 148, receives the lower end of a spring 157, the upper end of which bears against tube 147. Spring 157 urges the collar 156 against the arm 149. By lifting the collar 156, the tube 148 can be disconnected from the block 155 and supported by the cross pin 149b when arm 149 is moved so that screw 149a is in alignment with the tube. This provides access to pocket 153 in block 155 for cleaning. By pulling down the tube 147, it can be disconnected from plate 132 and bracket 131 so that tubes 147 and 148 can be removed.

Block 155 provides a hole 160 into which the thimbles T pass from the tube 148, the lowermost thimbles resting upon a shaft 161 journaled in block 155 and providing a thimble receiving pocket 162 which, in one position of the shaft, is in alignment with a hole 163 of block 155 which communicates with a discharging tube 164 which coupling members 165 and 166 secure to the bracket 130. To each shaft 161 there is secured a disc 167 and a cam 168, the spacing of members 167 and 168 being slightly in excess of the width of block 155 (Fig. 16) so that axial movement of shaft 161 is limited to that required for a running fit. Each cam 168 is engaged by a rod 169 attached to two leaf springs 170 (Fig. 19) which screws 171 attach to plates 172 with spacers 173 between. Screws 174 attach plates 172 to block 155. One of the springs 170 is connected with a pin 175 slidable in a hole provided by plate 172 and block 155. The shaft 161 is caused to rotate clockwise from the position shown at 180° so that its pocket 162 will be in alignment with the hole 160 of block 155. During this movement, the cam 168 brings its lower land into alignment with the rod 169, thereby permitting the blade 170 to move the pin 175 against the next to the lowermost thimble in hole 160 prior to the alignment of pocket 162 with hole 160 so that only the lowermost thimble descends into the pocket while the one above it is pinched by the pin 175 against the block 155. After the shaft 161 has received the lowermost thimble, it is caused to rotate counterclockwise 180° to cause that thimble to be discharged open end down into the tube 164.

Motion is imparted to the shaft 161 by a mechanism coordinated with the right hand bar 65 (Fig. 11). This bar is connected by a screw 180 (Fig. 15) threaded into bar 65 and secured in adjusted position by a nut 181. Screw 180 passes through a plain hole in a bar 182 and receives nuts 183 spaced from the bar 182 to receive springs 184 whereby motion from the bar 65 is imparted yieldingly to the bar 182 through said springs 184. Bar 182 extends upwardly to an integral bar 185 which extends to the right (Fig. 16) to an integral bar 186 (Fig. 16) which is notched to receive the teeth of a rack 190 to which the bar 186 is attached by screws 187. Rack 190 slides in a groove provided by a frame 130 and meshes with gears 191 attached to shaft 161. In order that motion of the rack 190 will be limited to that required for 180° rotation of shaft 161, two adjustable stop screws 192 and 194 (Fig. 15) are provided. Screw 192 threaded through bracket 30 is in alignment with the rack 190 and is secured in adjusted position by a lock nut 193. Screw 194 is threaded through a plate 195 (Fig. 17) which screws 196 attach to the frame 130. The screw 194 is retained in adjusted position by a lock nut 197. Screw 194 is in alignment with a block 198 which screws 199 attach to the rack 190. The block 198 is notched to receive the teeth of the rack. By proper adjustment of screws 192 and 194, motion of rack 190 is limited to that required for 180° rotation of shaft 161 in both directions. The motion of the rack 190 for this purpose is slightly less than the motion of bar 65 and the excess of movement of the latter is taken up by the springs 184.

Referring to Fig. 22, the switch with which the thimbles T are to be assembled, is, for example, the switch disclosed by the copending application of Brown and Lawson Serial No. 686,609, filed July 24, 1946, now Patent No. 2,512,788, issued June 27, 1950. The switch comprises a case 200 having parallel side walls 201 each provided with a row of detents 202, 203 and 204 which are respectively in alignment. A contact carrier 205 is provided with a notch 206 for receiving the thimbles T, a compression spring S and a spring retaining rod R. The spring S urges the thimbles T into the detents, thereby yieldingly maintaining the carrier 205 in any one of the three positions, such as, "off," bright" and "dim" when the switch is used to control automobile headlamps.

Before any parts are mounted within the switch case 200, it is placed upon the workholder 71 (Fig. 2) with the switch supporting bracket 205 extending from the case. The detents 203 are then locked in alignment with a groove 72a in the workholder 71 into which slot 72 opens. The thimbles T (Fig. 20) which are automatically discharged from the tubes 164 are received in grooves 104 of plate 63 which appear as lower in Fig. 5. The thimbles T gravitate through the wider portions 67a of the notches in plate 67. The spring S with the rod R inserted through it are manually deposited in the groove 104, said parts passing through the narrower slot portion 67b of plate 67. After the parts S and R have been placed, the operator depresses a pedal to cause the clutch to connect the power source with the shaft 88 which rotates counterclockwise in Fig. 11. This causes the bars 64 to approach each other and the rods 105 to move the parts T, S and R from the position shown in Fig. 20 to that shown in Fig. 21. These parts move into slot 72 to workholder 71 through holes 71a. The notched portions 67b of plate 67 being of a width less than the diameter of the thimbles T, these thimbles are retained in the grooves 104. In Fig. 21, the parts T, S and R are located between blade 102 and gate 74 and spring S is maintained under compression urging the thimbles against the rods 105. There being lost motion between pin 96 and blade 102 as provided by a slot 99 (Fig. 2), during the first part of the upward movement of plunger 93, the gate 74 is retracted; and, during further upward movement of plunger 93, the blade 102 lifts the parts T, S and R through the slot 72 and into the groove 72a of the workholder 71, where they are located in positions T', S' and R', indicated in dot-dash lines in Fig. 21. When these parts move into groove 72a, the spring S causes the thimbles T to snap into the detent 203, thereby completing the assembly of the parts T, S and R with the switch case 200. The switch case 200 is then removed from the workholder 71 and other parts are assembled therewith beginning with the contact carrier 205 whose notch 206 receives the parts T, S and R.

While the embodiment of the present invention as herein disclosed, constitutes a preferred form, it is to be understood that other forms might be adopted.

What is claimed is as follows:

1. A machine for assembling detent thimbles, a helical spring between them and a rod within the spring with an open case having opposite side walls provided with depression in alignment for receiving the thimbles when said thimbles are spread apart upon said rod by said spring, said machine comprising, a case holder having one end fixed and having its free end extending into the case, said holder having a through passage and having aligned openings on opposite sides thereof communicating with the passage and having a groove in the edge of the sides in alignment with the depressions of the case when the case is placed upon said case holder; members on opposite sides of the holder, each member having a channel communicating with a respective opening in said case holder, one of said channels receiving a thimble, a spring with a rod therein and the other channel receiving only a thimble; means for moving the respective thimbles from the channels and through the opening and into the passage of said case holder and for effecting compression of the spring and reception of the ends of the rod by the thimbles; and means movable within the passage of said case holder for moving the thimbles spring and rod into the groove in said case holder whereupon the spring forces the thimbles into the depressions of said case.

2. A machine for assembling detent thimbles and a helical spring within an open case having opposite walls provided with a pair of opposed and aligned depressions receiving the thimbles when urged apart by the spring; said machine including a holder having a vertical passage therein, a transverse passage therethrough in communication with said vertical passage, a pair of aligned openings adjacent said transverse passage and communicating with the ends theerof and a pair of aligned notches extending from the other end thereof adapted to align with the depressions in said case when the case is placed over said notched end of said holder; means for supporting a thimble and a spring opposite one opening and means for supporting a thimble adjacent the other opening of said holder; means for moving the thimbles toward each other and transverse the respective openings and into the through passage so that the thimbles will telescope at opposite ends of the spring and compress it therebetween; means vertically movable within the transverse passage for moving the thimbles and spring through the vertical passage and into said notches in said holder whereupon the spring urges the thimbles in opposite directions into aligned depressions in the case.

3. A machine according to claim 1 having a gate normally confining the thimbles, spring and rod in the lower portion of the passage while the first mentioned means forces the thimbles into said passage against the action of the spring, and means for retracting the gate in advance of operation of the second mentioned means.

References Cited in the file of this patent

UNITED STATES PATENTS

| 1,348,654 | Meutsch et al. | Aug. 3, 1920 |
| 1,493,480 | De Tour | May 13, 1924 |
| 1,994,043 | Lofman | Mar. 12, 1935 |
| 2,208,584 | Jeffords | July 23, 1940 |
| 2,310,638 | Hubbard | Feb. 9, 1943 |
| 2,359,575 | Norman | Oct. 3, 1944 |
| 2,361,783 | Laughlin | Oct. 31, 1944 |
| 2,459,954 | Morgan | Jan. 25, 1949 |

FOREIGN PATENTS

| 378,774 | Great Britain | Aug. 18, 1932 |
| 564,602 | Germany | Nov. 21, 1932 |